Sept. 11, 1956

S. E. PARKER 2,762,971

IMPEDANCE MEASURING SYSTEM

Filed April 30, 1952

INVENTOR.
Sam E. Parker.
BY D. C. Snyder
A. R. M'Crady
ATTORNEYS.

United States Patent Office 2,762,971
Patented Sept. 11, 1956

2,762,971

IMPEDANCE MEASURING SYSTEM

Sam E. Parker, San Diego, Calif.

Application April 30, 1952, Serial No. 285,298

10 Claims. (Cl. 324—57)

(Granted under Title 35, U. S. Code (1952), sec. 266)

The invention described herein may be manufactured and used by or for the Government of the United States of America for governmental purposes without the payment of any royalties thereon or therefor.

This invention relates to the measurement of electrical impedance, and it has particular relation to measurements of antenna impedance as a function of plate current in the power stage of a class C amplifier coupled to the unknown impedance.

In measuring the impedance of antennas, it is desirable that measuring equipment and procedures be as simple as possible. In aircraft for example, severe restrictions on weight, space, and operating personnel make it impracticable to use methods known to the prior art to measure impedances during flight. Bridge circuits for measuring impedance over a wide range of frequencies require adjustments of variable impedances and resistors to balance the bridge, and this process requires time-consuming readings of dials and plugs, mathematical calculations of the exact ratios involved, and elaborate standards; special null detecting devices are often required, and it is not possible to determine reactive and resistive components at one operation. Accurate measurements of impedance characteristics of flat top antennas used for high power, low frequency transmission are necessary, but antenna measuring systems commonly employed heretofore are unsatisfactory because they are unable to override the large amount of noise picked up by the extensive area involved.

In the instant invention, a simple transmitter or power source consisting of an oscillator, a buffer, and an amplifier is connected to the unknown impedance through a coupling circuit. The coupling circuit includes a transformer having primary and secondary windings and a variable capacitor associated with each winding. As the transformer coupling and capacitor settings are varied, the resulting changes in the amplifier plate current indicate both the resistance and reactance components of the unknown impedance. The equivalent reactance of the unknown is measured by changes in mutual inductance. The available power of the wave generator of the instant invention makes possible accurate impedance measurements at very low frequencies and on antennas of all sizes.

The invention also comprises a method of utilizing simple electrical elements in the manner indicated to measure impedance.

An object of the invention is to provide an improved method and apparatus wherein a coupling circuit is utilized with other simple circuit elements for quickly and simply measuring impedance.

Other objects and many of the attendant advantages of this invention will be readily appreciated as the same becomes better understood by reference to the following description.

Figure 1:
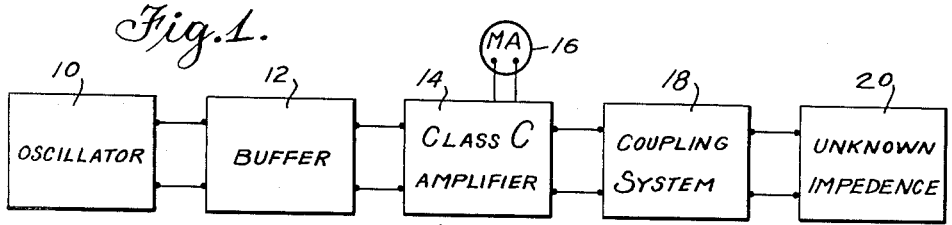
Fig. 1 is a block diagram showing the coupling circuit in relation to the elements with which it is used.

In Fig. 1, an oscillator 10, buffer circuit 12 and class C amplifier 14 are shown in block form since many suitable types are known to workers in the art. The buffer is necessary to isolate the oscillator from the load because simple oscillators delivering their output directly have the disadvantage that any change in load reacts upon the oscillator and tends to change the frequency. The amplifier is preferably operated under class C conditions in order to obtain sharp plate current changes as the amplifier load becomes resonant. Class B and class A amplifiers exhibit gradual changes in plate current as the coupling circuits near resonance. A current-indicating device 16 which may conveniently be a milliammeter is inserted in the plate circuit of the amplifier stage. The coupling circuit 18 couples the component 20 to be measured to the output of amplifier 14.

Figure 2:
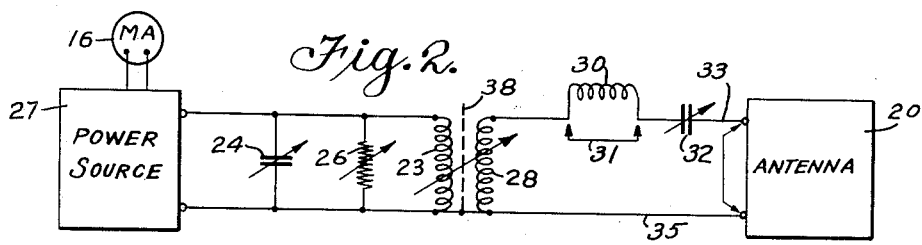
Fig. 2 is a diagram showing a suitable form of the coupling circuit.

The coupling circuit shown in Fig. 2 includes a transformer primary 23, a variable capacitor 24, and a variable resistor 26 connected in parallel. The output of the class C amplifier of power source 27 is connected through transformer winding 28 and leads 33 and 35 to the unknown impedance 20, and the amplifier plate current is indicated by meter 16. The transformer secondary 28 is movable relative to the primary in order to vary the degree of coupling between them, and is connected in series with inductor 30 which may be shunted out by means of conductor 31, variable capacitor 32, and the impedance 20 to be measured.

A shield 38 is placed between transformer windings 23 and 28. Conductor 31 serves as a shunt effective to cancel the effect of inductor 30 when conductor 31 is placed in the circuit.

In the operation of the circuit thus far described, the oscillator, buffer, and amplifier sections forming the power supply are first adjusted to give the required frequency and excitation voltage which are kept reasonably constant during subsequent steps. This is easily accomplished since these three sections form what is essentially a signal generator which is calibrated in the ordinary manner. Pointer settings on calibrated dials are established before running a test and left undisturbed until the test is completed. The frequency range employed may be from 30 megacycles down to very low frequencies, depending upon the permissible size of circuit components. Conductor 31 is connected across inductance 30 to shunt it out of the circuit when the impedance under test has a low capacitive reactance. With transformer windings 23 and 28 adjusted for zero coupling, the plate-tank capacitor 24 is adjusted for minimum plate current as evidenced by plate current indicator 16. With leads 33 and 35 short circuited, and with slight coupling of the shielded transformer windings, capacitor 32 is adjusted for a sharp rise in plate current. The transformer coupling is increased while capacitors 24 and 32 are adjusted to give a specified increase in the amplifier D. C. plate current. This adjustment, which is especially important in the operation of the equipment, means that a value of coupling is obtained with capacitor 32 adjusted for maximum plate current while capacitor 24 is adjusted for minimum plate current. This final value of plate current is hereinafter referred to as I(max-min). Finally, with the unknown impedance connected to leads 33 and 35, the transformer windings, capacitor 24 and capacitor 32 are readjusted to again obtain a plate current of I(max-min).

The reactance of the unknown is obtained from the difference between the two readings of capacitor 32, and the unknown resistance $R_x$ is obtained from the linear relationship $$(\Delta M)^2 \alpha R_s$$

where M is the extent of coupling between transformer windings 23 and 28, and where $R_s = R_c + R_x$.

These conditions follow from the facts that the secondary circuit is very near resonance and constant loading of the power amplifier results from the operating procedure described. The final value $R'_L$ of plate-load resistance is given by $$R'_L = \frac{L_b}{C_b \left( R_b + \frac{M^2 \omega^2}{R_s} \right)}$$

Figure 3:
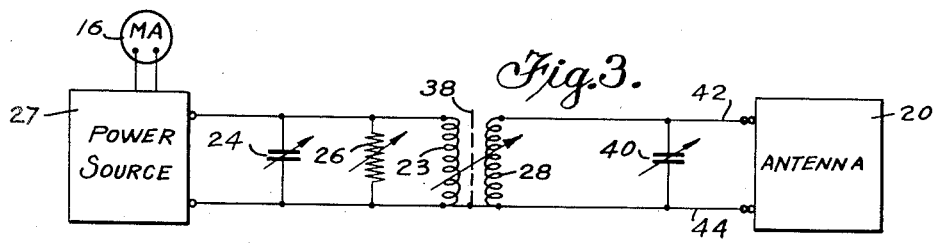
Fig. 3 is a diagram showing a modified form of the coupling circuit.

A modification of the coupling circuit is shown in Fig. 3. For measuring high impedances, a variable capacitor 40 is connected in parallel with transformer winding 28. Except for the substitution of capacitor 40 of Fig. 3 for capacitor 32 and inductor 30 of Fig. 2, the coupling circuits of Fig. 2 and Fig. 3 are identical.

In the operation of the apparatus including the modification shown in Fig. 3, the preliminary adjustments of frequency and excitation voltage are the same as for the apparatus of Fig. 2. Capacitor 24 is tuned for minimum plate current in the amplifier plate circuit with zero transformer coupling. With slight coupling and with leads 42 and 44 open circuited by disconnecting antenna 20, the secondary capacitor 40 is adjusted for a sharp rise in plate current while transformer coupling and capacitor 24 settings are adjusted for a specified plate current I(max-min). The high impedance unknown is then connected to leads 42 and 44 and the transformer coupling, capacitor 24, and capacitor 40 are readjusted to again obtain a plate current of I(max-min) indicated by meter 16.

Figure 4:
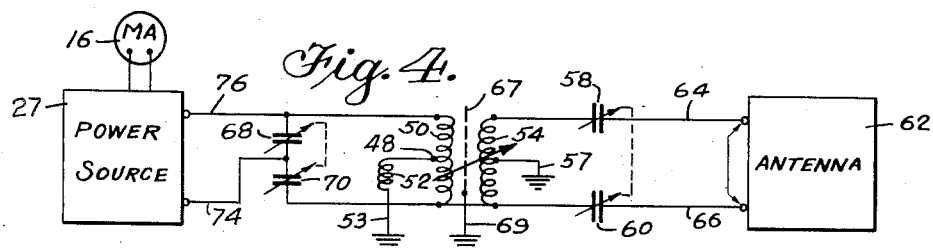
Fig. 4 shows a further modification of the circuit disclosed in Fig. 2.

This operation procedure gives the susceptance of the unknown in terms of the change in capacitance of capacitor 40. The conductance $G_x$ of the unknown is given by the change in coupling $\Delta M$. In this case: $\Delta M^2 \alpha G_t$, which is equivalent to: $\sin^2 \theta \alpha G_t$, where $\theta$ is the coupling angle of the transformer windings. Then $$\omega \Delta C_p = \pm B_x = \frac{\pm X_x}{R_x^2 + X_x^2}$$

and $$R'_L = \frac{L_b}{C_b \left( R_b + \frac{M^2 \omega^2 B_p^2}{G_t} \right)}$$

where:

$\theta$ = coupling angle $G_t = G_c + G_x$ $B_p = |B_c| = \frac{1}{|\omega L_c|}$ Fig. 4 shows a modification of the circuit of Fig. 1 in which a balanced primary circuit is provided with the center point 48 of coupling coil 50 grounded in order to make possible the measurement of balanced impedances such as dipole antennas and certain types of transmission lines. Coil 52 is positioned in grounded lead 53 to permit the tank circuit to find its center thus making it unnecessary to locate the exact electrical center of coil 50. Coil 54 is grounded at the midpoint by means of lead 57. Secondary coil 54 is connected through coupled variable capacitors 58 and 60 to the impedance 62 under test which is connected through leads 64 and 66. Shielding 67 between windings 50 and 54 is grounded by means of lead 69. The coupled variable capacitors 68 and 70 serve to tune the primary circuit. Lead 74 connects one terminal of power source 27 to the coupling circuit at a point between capacitors 68 and 70, and lead 76 connects the other terminal of power source 27 to the coupling circuit.

Figure 5:
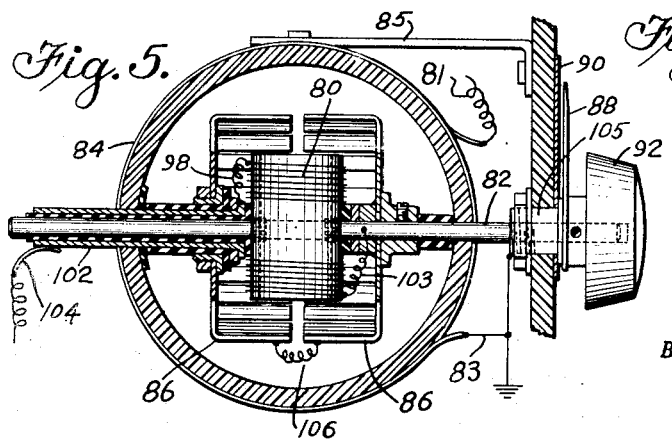
Fig. 5 is a sectional view of a suitable coupling transformer.

Fig. 5 shows a transformer suitable for use in the coupling circuit. The secondary winding 80 is rigidly secured to shaft 82 and positioned inside stationary primary winding 84 which is maintained in place by bracket 85. Connections to the primary are through leads 81 and 83. A slotted shield 86 surrounding the secondary is symmetrical to ground at all times so capacitive coupling to ground is constant, capacitive coupling between the two windings is eliminated, and single-point injection of the induced voltage is provided. The slots in shield 86 are effective to cut down on losses due to eddy currents. The degree of coupling (M) of the two windings is indicated by the setting of pointer 88 on scale 90 as secondary 80 is rotated by means of knob 92. One end of secondary winding 80 is connected to the coupling circuit by means of lead 98 which is insulated from shaft 82 and shielding 86. From lead 98, the current flows through conductor 102, which is a concentric sleeve affixed to said shaft and insulated therefrom, and is taken off by means of wiper arm 104 as the shaft rotates. The other end of secondary winding 80 is simply connected through lead 103 to shaft 82 which in turn is electrically connected to shielding 86 and to grounded bushing 105. The two sections of shielding 86 are connected through two opposing fingers at point 106.

Figure 6:
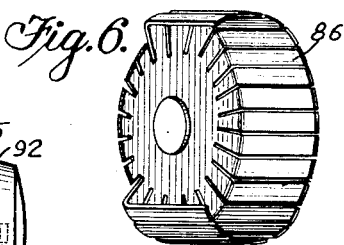
Fig. 6 is a perspective view of shielding for the coupling transformer.

Fig. 6 shows, in a cutaway perspective view, one section of shielding 86. Eddy current losses are held to a very low value by making the slots continuous almost to the hub and by forming the shielding in two generally similar sections. In practice, both sections of shielding 86 may be grounded by connecting one finger of the insulated section with an adjacent finger of the grounded section. The single point of contact does not materially reduce the efficiency of the shielding.

It will be obvious that the details of the oscillator and buffer stages are not significant as long as the required excitation voltage for the class C power amplifier is provided at a constant frequency. The plate-tank circuit may be either single-ended or double-ended with the latter form indicated if neutralization is required.

Obviously many modifications and variations of the present invention are possible in the light of the above teachings. It is therefore to be understood that within the scope of the appended claims the invention may be practiced otherwise than as specifically described.

What is claimed is:

1. An impedance measuring system comprising an oscillator, a buffer stage connected to output of said oscillator, a class C amplifier connected to the output of said buffer stage, current indicating means in the plate circuit of said amplifier, a primary transformer winding connected across output of said amplifier, a first variable capacitor in parallel with said primary winding, a movable secondary transformer winding, means to position said secondary winding relative to said primary winding, a Faraday shield surrounding said secondary winding, a second variable capacitor, connecting means effective to connect an unknown impedance and said second variable capacitor in series with said secondary winding, and means effective to short circuit terminals of the unknown impedance to be tested.

2. The invention defined in claim 1, comprising in addition an inductor placed in series with said second capacitor.

3. An antenna impedance measuring system comprising a signal generator having class C amplification in the final stage, indicating means effective to indicate current flow in the plate circuit of said final stage, a first transformer winding connected to the output of said signal generator, a first variable capacitor connected in parallel with said first transformer winding, a variable resistor connected in parallel with said first transformer winding, a second transformer winding connected to the antenna to be tested, a second variable capacitor connected in parallel with said second transformer winding, shielding means between said first and second transformer windings, means to vary the coupling between said first and second transformer windings, and means to disconnect the antenna to be tested.

4. A method of measuring antenna impedance comprising feeding the output of a signal generator having class C amplification in the final stage to a parallel resonant primary circuit capable of being tuned, coupling a series resonant secondary circuit capable of being tuned and including the impedance to be measured to said primary circuit by means of a variable coupling transformer, adjusting capacitance in said primary circuit to obtain minimum plate current in the final stage of said signal generator while adjusting transformer coupling and secondary circuit capacitance to obtain a maximum plate current, and short circuiting the antenna terminals and again adjusting primary circuit capacitance to obtain minimum plate current while adjusting transformer coupling and secondary series capacitance to obtain the maximum plate current whereby the change of adjustment of secondary capacitance required to reobtain said maximum plate current when the antenna terminals are short circuited is a measure of antenna reactance and the corresponding change of adjustment of transformer coupling is a measure of antenna resistance.

5. An antenna impedance measuring system comprising a signal generator having class C amplification in the final stage; indicating means effective to indicate current flow in the plate circuit of said final stage; a balanced primary circuit including a first variable capacitor, a second variable capacitor ganged to said first capacitor and in series therewith, a first coil in series with said first and second capacitors to form a closed loop, a second coil having one end grounded and the other end connected to the midpoint of said first coil, and means effective to connect the output of said signal generator across said first capacitor; a secondary circuit including a third coil having a center tap connected to ground, a third variable capacitor in series with one end of said third coil, a fourth variable capacitor similarly connected to the other end of said third coil and ganged with said third capacitor, means to connect the unknown impedance to said third and fourth capacitors and means to short circuit said impedance; shielding means between said first and third coils; and means to vary the coupling between said first and third coils.

6. A method of measuring antenna characteristics comprising feeding the output of a signal generator having class C amplification in the final stage to a parallel resonant primary circuit capable of being tuned, coupling a parallel resonant secondary circuit capable of being tuned and including the impedance to be measured to said primary circuit by means of a variable coupling transformer, adjusting capacitance in said primary circuit to obtain minimum plate current in the final stage of said signal generator while adjusting transformer coupling and secondary circuit capacitance to obtain a maximum plate current, open circuiting the antenna terminals, and again adjusting primary circuit capacitance to obtain minimum plate current while adjusting transformer coupling and secondary capacitance to obtain the maximum plate current whereby the change of adjustment of secondary capacitance required to reobtain said maximum plate current when the antenna terminals are open circuited is a measure of antenna susceptance and the corresponding change of adjustment of transformer coupling is a measure of antenna conductance.

7. Impedance measuring circuit comprising an A. C. generator, a class C amplifier connected to be energized by said generator and having a D. C. plate current meter, an adjustable coupling transformer having its primary connected to the output of said amplifier, at least one adjustable capacitor across said primary, at least one adjustable capacitor connected in the secondary circuit of said transformer and means for connecting an unknown impedance in said secondary circuit.

8. Method of measuring impedance which comprises energizing the impedance from the secondary of a transformer connected to the output of a class C amplifier, said transformer having at least one capacitor across the primary thereof and at least one capacitor in the secondary circuit thereof, and adjusting the transformer coupling until a predetermined $I_b$ (max-min) is obtained, $I_b$ (max-min) being obtained by adjusting the primary capacitors to bring the amplifier plate current ($I_b$) to a minimum while simultaneously adjusting the secondary capacitors to bring said current to a maximum.

9. An impedance measuring system comprising a signal generator including an amplifier having a D. C. ammeter in the plate circuit thereof, a primary transformer winding connected across the output of said amplifier, first variable capacitor means connected in parallel with said primary winding, a secondary circuit including a movable secondary transformer winding, means to position said secondary winding relative to said primary winding to vary the coupling therebetween, second variable capacitor means connected in said secondary circuit, and means in said secondary circuit for connecting thereinto or selectively disconnecting therefrom an unknown impedance to be tested.

10. A method of measuring impedance which comprises feeding the output of a signal generator to a tunable resonant primary circuit, coupling a tunable resonant secondary circuit to said primary circuit, said primary circuit having a primary transformer winding and said secondary circuit having a secondary transformer winding adjustable relative to said primary winding to vary the transformer coupling therebetween, with an unknown impedance effectively connected in said secondary circuit tuning said primary circuit to obtain minimum D. C. output current from said generator while adjusting said transformer coupling and tuning said secondary circuit to obtain maximum D. C. output current from said generator, with said unknown impedance effectively disconnected from said secondary circuit again tuning said primary circuit to obtain minimum D. C. output current while adjusting said transformer coupling and tuning said secondary circuit to obtain maximum D. C. output current whereby the change in tuning of the secondary circuit to reobtain said maximum D. C. output current when the unknown impedance is effectively disconnected from the secondary circuit is a measure of one impedance characteristic of the unknown impedance and the corresponding change of adjustment of transformer coupling is a measure of another impedance characteristic of the unknown impedance.

References Cited in the file of this patent
UNITED STATES PATENTS

| | | |
|---|---|---|
| 2,018,673 | Howe | Oct. 29, 1935 |
| 2,475,044 | Mulder | July 5, 1949 |
| 2,509,427 | Frey | May 30, 1950 |
| 2,547,650 | McCool | Apr. 3, 1951 |
| 2,551,337 | Van B. Roberts | May 1, 1951 |
| 2,588,702 | Cornelius | Mar. 11, 1952 |
| 2,617,859 | Kraft | Nov. 11, 1952 |